(12) United States Patent
Lipka et al.

(10) Patent No.: US 9,654,301 B2
(45) Date of Patent: May 16, 2017

(54) METHOD, SYSTEM AND SOFTWARE PRODUCT FOR STREAMING CONTENT

(75) Inventors: Martin Lipka, Prahan (AU); David Winter, Prahan (AU)

(73) Assignee: VIVIDAS TECHNOLOGIES PTY LTD (AU)

( * ) Notice: Subject to any disclaimer, the term of this patent is extended or adjusted under 35 U.S.C. 154(b) by 449 days.

(21) Appl. No.: 12/279,111

(22) PCT Filed: Feb. 13, 2007

(86) PCT No.: PCT/AU2007/000193
§ 371 (c)(1),
(2), (4) Date: Dec. 12, 2008

(87) PCT Pub. No.: WO2007/115352
PCT Pub. Date: Oct. 18, 2007

(65) Prior Publication Data
US 2009/0319557 A1 Dec. 24, 2009

(30) Foreign Application Priority Data
Feb. 13, 2006 (AU) .............................. 2006900685

(51) Int. Cl.
*G06F 17/30* (2006.01)
*H04L 12/18* (2006.01)
(Continued)

(52) U.S. Cl.
CPC ....... *H04L 12/1881* (2013.01); *H04N 19/436* (2014.11); *H04N 19/46* (2014.11);
(Continued)

(58) Field of Classification Search
CPC .......... H04L 12/1881; H04N 21/23439; H04N 21/23805; H04N 21/2187; H04N 21/6377; H04N 21/658; H04N 21/845; H04N 19/46
(Continued)

(56) References Cited

U.S. PATENT DOCUMENTS 4,890,283 A * 12/1989 Tsinberg et al. .............. 370/538
6,272,658 B1 * 8/2001 Steele et al. .................. 714/752
(Continued)

FOREIGN PATENT DOCUMENTS

| GB | 2398467 A | 8/2004 |
|---|---|---|
| WO | 02/49343 A1 | 6/2002 |
| WO | 2005/004434 A1 | 1/2005 |

OTHER PUBLICATIONS

"Streaming Media Overview," Chapter 4 of Cisco ACNS Software Caching Configuration Guide, Copyright 2002, Cisco Systems, Inc., pp. 4-1 to 4-10.
(Continued)

*Primary Examiner* — Shiow-Jy Fan
(74) *Attorney, Agent, or Firm* — Sheridan Ross P.C.

(57) ABSTRACT

The present invention relates to methods and systems for streaming content and in particular, live content. The method includes the steps of: receiving a content stream; periodically encoding the received stream into a sequence of content files to thereby create a plurality of sequential content files; assigning a sequence identifier to each content file; storing the files on a host; delivering a data file to a media player responsive to a request for live content, said data file including information enabling the media player to sequentially and individually request each content file from the host and play the requested content file; and delivering requested content files responsive to each request.

20 Claims, 5 Drawing Sheets

(51) Int. Cl.
| | |
|---|---|
| *H04N 21/2187* | (2011.01) |
| *H04N 21/2343* | (2011.01) |
| *H04N 21/238* | (2011.01) |
| *H04N 21/6377* | (2011.01) |
| *H04N 21/658* | (2011.01) |
| *H04N 21/845* | (2011.01) |
| *H04N 19/46* | (2014.01) |
| *H04N 19/436* | (2014.01) |

(52) U.S. Cl.
CPC ... *H04N 21/2187* (2013.01); *H04N 21/23439* (2013.01); *H04N 21/23805* (2013.01); *H04N 21/6377* (2013.01); *H04N 21/658* (2013.01); *H04N 21/8456* (2013.01)

(58) Field of Classification Search
USPC .................. 707/999.102, 791, 802; 709/231
See application file for complete search history.

(56) References Cited

U.S. PATENT DOCUMENTS

| | | | |
|---|---|---|---|
| 6,342,904 B1* | 1/2002 | Vasudevan | H04N 19/587 375/E7.253 |
| 6,389,473 B1 | 5/2002 | Carmel et al. | |
| 6,405,256 B1 | 6/2002 | Lin et al. | |
| 6,453,112 B2* | 9/2002 | Imahashi et al. | 386/46 |
| 6,970,937 B1* | 11/2005 | Huntington | H04L 29/06027 348/E7.069 |
| 2002/0085713 A1 | 7/2002 | Feig et al. | |
| 2002/0120675 A1 | 8/2002 | Everett et al. | |
| 2003/0097661 A1 | 5/2003 | Li et al. | |
| 2003/0185297 A1 | 10/2003 | Greenfield et al. | |
| 2003/0191816 A1* | 10/2003 | Landress | G06Q 30/02 709/219 |
| 2004/0103208 A1 | 5/2004 | Chung et al. | |
| 2004/0240541 A1* | 12/2004 | Chadwick et al. | 375/240.01 |
| 2005/0005000 A1 | 1/2005 | Yoshimoto | |
| 2005/0183120 A1 | 8/2005 | Jain et al. | |
| 2005/0262257 A1* | 11/2005 | Major | H04N 21/25808 709/231 |

OTHER PUBLICATIONS

Kontothanassis et al., "A Transport Layer for Live Streaming in a Content Delivery Network", Proceedings of the IEEE, HP Cambridge Research Lab, Akamai Technologies, MIT Department of Mathematics, Cambridge, MA, 11 pages.

International Search Report and Written Opinion prepared by Australian Patent Office on Apr. 2, 2007, for International Application No. PCT/AU2007/000193; Applicant, Vividas Technologies Pty Ltd.

International Preliminary Report on Patentability (Chapter II of the PCT) prepared by the Australian Patent Office on Jan. 24, 2008, for International Application No. PCT/AU2007/000193; Applicant, Vividas Technologies Pty Ltd.

Kontothanassis et al., "A Transport Layer for Live Streaming in a Content Delivery Network", Proceedings of the IEEE, vol. 92, No. 9, Sep. 2004, 12 pages.

Rao et al., "Comparative Evaluation of Server-push and Client-pull Architectures for Multimedia Servers", Distributed Multimedia Computing Laboratory, Department of Computer Sciences, University of Texas at Austin, 4 pages.

Official Action for European Patent Application No. 07 763 750.2-2223, mailed Jul. 14, 2011, 8 pages.

Official Action for European Patent Application No, 07 763 750.2-2223, mailed Sep. 26, 2012, 8 pages.

Summons to attend oral proceedings pursuant to Rule 115(1) EPC for European Patent Application No. 07 763 750.2-2223, mailed Jul. 24, 2013, 6 pages.

Supplementary European Search Report for European Patent Application No. 07 763 750.2-2223, mailed Dec. 6, 2010, 10 pages.

* cited by examiner

METHOD, SYSTEM AND SOFTWARE PRODUCT FOR STREAMING CONTENT

CROSS REFERENCE TO RELATED APPLICATIONS

This application is a national stage application under 35 U.S.C. 371 of PCT Application No. PCT/AU2007/000193, having an international filing date of 13 Feb. 2007, which designated the United States, which PCT application claimed the benefit of Australian Application No. 2006900685 filed 13 Feb. 2006, the entire disclosure of each of which are hereby incorporated herein by reference.

FIELD OF THE INVENTION

The present invention relates to the field of data communications. In particular, the present invention relates to a method, system and software product for streaming content, and in particular live content, over communication networks.

BACKGROUND OF THE INVENTION

In this specification, where a document, act or item of knowledge is referred to or discussed, this reference or discussion is not an admission that the document, act or item of knowledge or any combination thereof was at the priority date:
(i) part of common general knowledge; or
(ii) known to be relevant to an attempt to solve any problem with which this specification is concerned.

With the uptake of broadband connections has come a corresponding increase in the volume of audiovisual material viewed over point-to-point communication networks, such as the Internet. This increase in viewer numbers is in turn motivating content providers to release more content onto the Internet for viewing. Moreover, in view of developing applications such as IPTV and wireless connection technologies and devices, it is likely that point-to-point networks will grow in stature as communications platforms for audiovisual content, even to the point of rivaling traditional broadcast networks.

Software and hardware architectures for audiovisual streaming have largely developed around the delivery of pre-recorded content—a process known as 'on-demand' streaming—with less consideration given to the task of streaming live content.

An example of a live streaming system is described in *A Transport Layer for Live Streaming in a Content Delivery Network* Proceedings of the IEEE, Volume: 92, Issue: 9 page(s): 1408-1419 in which a complex Content Delivery Network (CDN) is deployed to transport live streams to end users.

As known to those skilled in the art, CDNs operate by replicating contention network nodes that are strategically distributed throughout the globe to be closer to end users in terms of network hops. The nodes—each of which may comprise a number of servers—tend to be privately owned by enterprises that offer content delivery services to large web sites, and cooperate with each other to satisfy requests for content by end users, transparently moving content behind the scenes to optimize the delivery process.

Optimization can take the form of reducing bandwidth costs, improving end-user performance, or both.

When optimizing for end-user performance, locations that can serve content quickly to the user may be selected. This selection may be realised by choosing locations that are the fewest number of hops or fewest number of network seconds away from the requester, so as to optimize delivery across local networks. When optimizing for cost, locations that are less expensive to serve from may be selected.

Broadly speaking, the Live streaming CDN includes: Entry Point Machines that act as origin proxies for the encoded multimedia data comprising the live stream; Set Reflectors to which the stream data is fanned from the Entry Points; and Streaming Servers, which are themselves grouped in regions and linked by a private multicast network. Streams are supplied to the individual users from the Streaming Servers via a unicast protocol.

Every effort is made to maintain a continuous flow of stream data from the Entry Points to the Streaming Servers, through various packet recovery techniques, including inserting parity packets within a stream or across a combination of streams, Reed-Solomon codes and retransmits, as well as adaptive multipath transmission across various Set Reflectors.

The present invention aims to provide an alternative approach to the task of streaming content, and in particular live content over communication networks.

SUMMARY OF THE INVENTION

According to a first aspect of the present invention there is provided a method for streaming content, including the steps of:
  receiving a content stream;
  periodically encoding the received stream into a sequence of files to thereby create a plurality of sequential content files;
  assigning a sequence identifier to each content file;
  storing the content files on a host;
  delivering a data file to a media player responsive to a request for content, said data file including information enabling the media player to sequentially and individually request each content file from the host and play the requested content file; and
  delivering requested content files responsive to each request.

The present invention may be utilized to transport both on-demand and live streams. In the case of live streaming, in contrast to the prior art, the present invention does not attempt to preserve the continuity of a live stream, but instead stores (or caches) the stream as a plurality of sequential files that are individually requested by, and delivered to, end users. Ostensibly, the solution appears somewhat counterintuitive, in that live media—which is essentially dynamic—is delivered as a set of static files, and in fact the prior art teaches that live streaming does not lend itself to caching. However, the inventors have found that the solution provides a satisfactory end user experience notwithstanding the possible break in continuity of the live stream.

Another key advantage of the present invention, is that by converting live streams into a sequence of static files, allows delivery of the stream to end users using existing Internet protocols, and in particular the FTP and HTTP protocols. As known in the art, FTP and HTTP are both almost universally implemented and supported, open standards, which work with almost all acceleration, caching and proxying technologies.

Converting live streams to static files has enabled the inventors to leverage off established technology, thereby avoiding the enormous expense of creating and maintaining dedicated live streaming CDNs, as suggested by conventional approaches.

Other advantages arise from the present invention, such as the ability for live streams to be watched as on-demand streams immediately after their completion, and for the streams to be picked up and viewed by a viewer other than from the current position (by requesting files earlier in the sequence), both of which are not possible with prior art systems, without actually recording the live stream on the media player.

A further distinguishing feature of the present invention is that it operates as at "pull" solution, wherein portions of the live stream are continually requested by, and delivered to the player, rather than opening a single data connection over which the entire stream is delivered, as occurs in the prior art. This enables flow control means to be conveniently adopted to match the incoming data rate with the rate of decoding occurring at the Player.

Preferably, the sequence identifier is recorded in the file name of each content file.

Optimally, the data file includes the file name of the first sequential content file and she network location of the host.

In preferred embodiments, the data file includes information enabling the media layer to calculate the sequence number of, and thereby request, the last sequential content file in the sequence. For example, the information may include:

the commencement time ($t_c$) of the requested live content;
details of a facility from which a current time ($t_r$) is available;
the frame rate (FPs) of the live content stored in each file; and
the number of frames stored in each file, wherein the sequence number of the last sequential content file ($S_L$) may be calculated according to the following formula and requested from the host:

$$S_L = F_e / F_{block}$$

$$F_e = t_e / FPs$$

$$t_e = t_c - t_r$$

Optionally, the data file includes the network location of one or more additional hosts from which a media player may request content files in the event of unsuccessful delivery from the host.

Typically, the host is a web server, streaming live content to one or more directly connected media players. However, in alternative embodiments, the host is an ingestion system for a content delivery network.

Optimally, the encoding step comprises cyclically directing the content stream through two or more encoders. This often allows the encoders to simultaneously encode individual portions of the content stream.

According to a second aspect of the present invention, there is provided a content streaming systems including:
a streaming application; and
a host communicatively coupled to the streaming application, wherein content received by the streaming application is periodically encoded into a sequence of content files to thereby create a plurality of sequential files, each file being assigned a sequence number upon its creation and being transferred to the host along with a data file including information enabling a media player to sequentially and individually request each content file from the host and play the requested content file.

Typically, the content received by the streaming application is live content.

According to a third aspect of the present invention, there is provided a method for receiving and playing streamed content, said content having been periodically encoded into a plurality of sequential content files, each of which having a sequence identifier, and stored on a host, the method including the steps of:

downloading a data file including information enabling the sequential content files to be individually requested in sequence;
requesting each content file from the host; and
playing each content files.

Typically, the content is live content.

In preferred embodiments, the method includes the further step of requesting the next content file in the sequence, in the event that a requested content file is not received within a specified timeframe.

According to a fourth aspect of the present invention there is provided a method for encoding a live audiovisual stream for transmission over a point to point communications network in, or close to, real time, the method including the steps of:

receiving a live audiovisual stream;
after a predetermined time period, dividing the portion of the live stream which arrived during the time period into one or more segments;
concurrently encoding the segments in parallel on separate processors; and returning to step (a) in the event that the live stream continues to arrive after completion of the encoding step.

According to a fifth aspect of the present invention there is provided a method for streaming live audiovisual media over a point to point communications network in, or close to, real time, the method including the steps of:

receiving a live audiovisual stream;
dividing the live stream into segments;
dividing each segment into two or more subsegments;
encoding the subsegments in parallel on separate processors; and
uploading each encoded subsegment to one or more edge servers to be stored at said server as discrete files with sequence information to enable viewers to commence viewing the live stream from the edge server from any selected file.

The present invention also provides computer software products including computer-executable instructions for carrying out the methods and implementing the systems according to the other aspects of the invention.

Further aspects and advantages of the present invention will become evident from consideration of the illustrations and examples that follow.

DESCRIPTION OF THE DRAWINGS

A preferred embodiment of the present invention will now be described with reference to the accompanying drawings, in which.

DETAILED DESCRIPTION OF THE DRAWINGS

Figure 1:
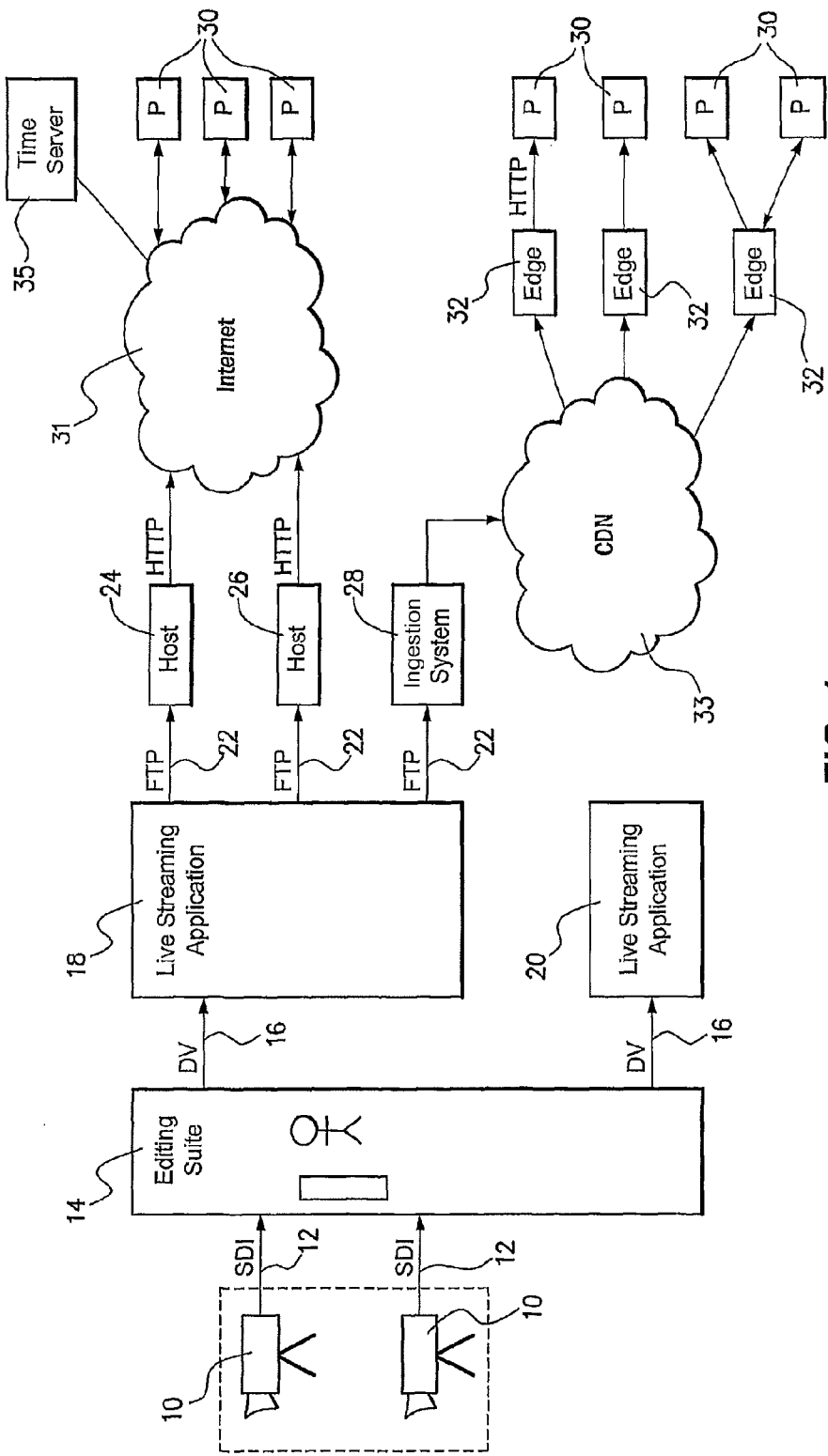
FIG. 1 is a schematic illustration of a suitable network architecture upon which the present invention may be implemented.

Turning to FIG. 1, cameras and sound recording equipment 10 capture content, which is transmitted via a suitable Serial Data Interface (SDI) 12 to an Editing Suite 14, where the various audio and video feeds are combined into a composite broadcast signal. The composite signal 16 is transmitted via a suitable Digital Video (DV) Interface to a computer system, upon which a Live Streaming Application 18 according to the present invention is installed.

Redundancy is provided by a second Live Streaming Application 20 to which the composite signal 16 is simultaneously transmitted. The secondary application 20 may be utilized in the event of failure of either the primary application 18 or the DV connection 16. Of course any number of such parallel Applications can be provided for enhanced quality of service.

As discussed below in further detail, the Live Streaming Application 18 receives the composite signal and sequentially encodes the signal into a series of files 22. These files are simultaneously transferred over the Internet via the File Transfer Protocol (FTP) to Hosts 24, 26, 28.

Hosts 24 and 26 are Web Servers, whereas Host 28 is an Injection System for a Content Delivery Network (CDN) 33. The Web Servers 24 make the files 22 directly available to Media Players 30 over the Internet 31, via the Hypertext Transfer Protocol. Multiple Web Servers 24, 26 are deployed to provide further redundancy to the system, such that a secondary server 26 may be utilized in the event of failure of a primary server or Internet network congestion.

The Injection Ingestion System 28 serves as a front end to a Content Delivery Network (CDN) 33. As discussed in the introductory section above, CDNs operate by replicating content—in this case the files 22—on a series of Edge Servers 32 (which are themselves Web Servers), that are operatively connected through the Internet 31 and/or a private CDN 33 to the Ingestion System 28. There may of course be numerous network nodes made up of routers, switches etc. separating the Ingestion System 28 and the Edge Servers 32. In addition, some of the Edge Servers 32 may be linked together in regions through a private multicast network interface shared by each Edge Server 32 in that region.

The present invention operates independently of whatever replication methods and CDN architecture that may be deployed. The series of files 22 are merely transferred to the Ingestion System 28 via FTP, whereupon they are fanned out to the Edge Servers 32. Once at the Edge Servers 32, the files are made available to Media Players 30 via HTTP in the same way as a direct connection by way of Web Servers 24 and 26.

Figure 2:
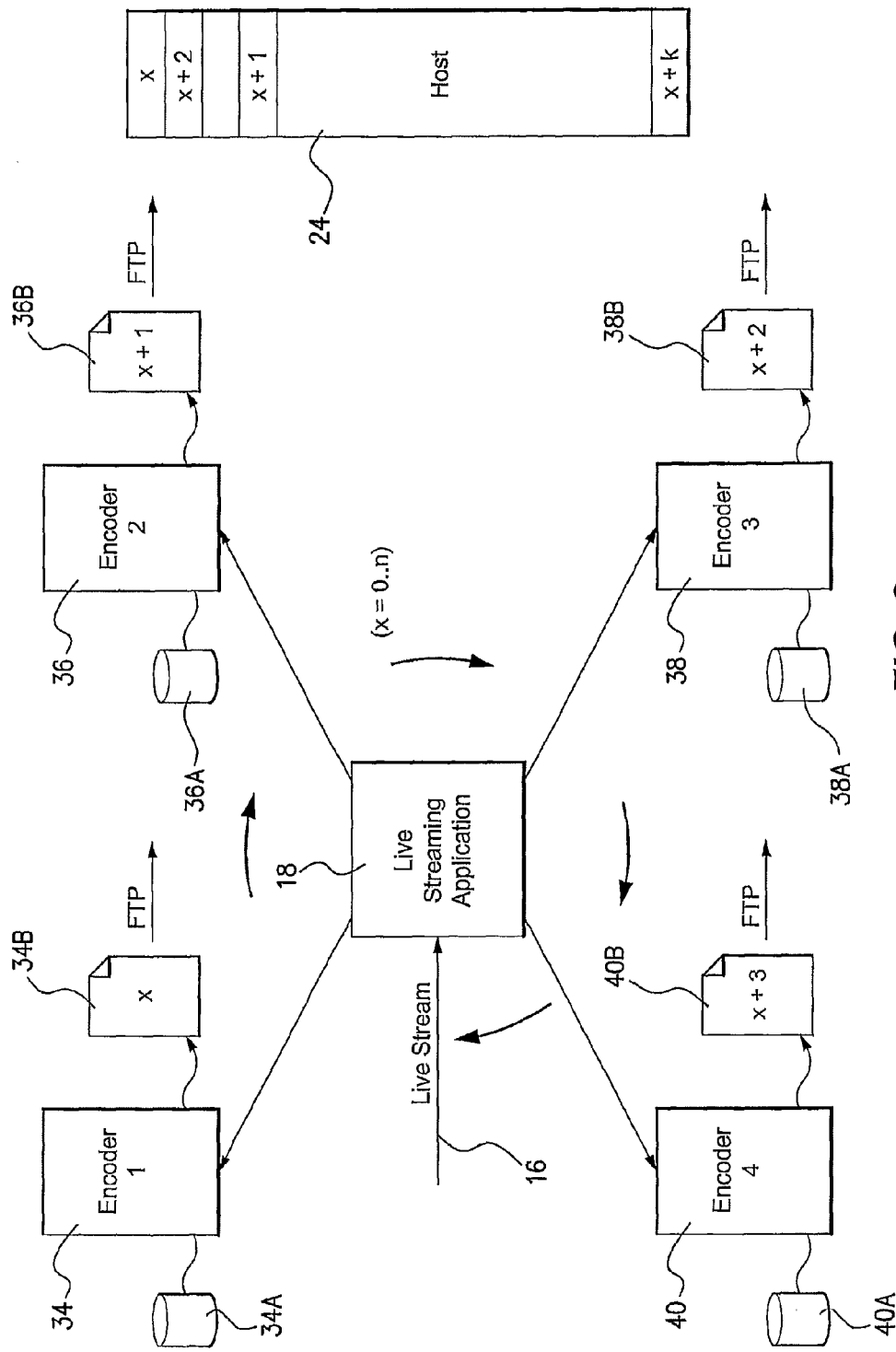
FIG. 2 is a flowchart illustrating the steps of a preferred encoding scheme adopted for use in the present invention.

Turning to FIG. 2, the encoding method adopted by the Live Streaming Application 18 in converting a continuous, real-time live stream 16 into a sequence of individual files is illustrated. Each file contains a portion of the live stream captured over a time interval of predetermined length. The inventors have found the task of interval selection to involve a a trade off between preserving the real time quality of a stream (which is achieved by long intervals), and encoder efficiency (which is provided by short intervals). A length of about 4 seconds has been found to be suitable for most live streams.

Multiple Encoders 34, 36, 38 and 40, (in this case four, but of course any number could be used) are deployed to encode the live stream according to any suitable codec (Windows Media, Quicktime, Real, MPEG, etc.). Each Encoder 34, 36, 38 and 40 may be a separate software process running on the same hardware, or separate hardware modules.

The Live Stream 16 is received at the Application 18 and directed into the first Encoder 34. After expiry of the selected time interval, the stream 16 is directed into the second Encoder 36, with the first Encoder 34 then commencing its encoding task on the received stream. After expiry of the second and then third time interval, the stream is respectively directed to the third 38 and fourth 40 Encoders, with the previous encoder commencing its encoding task.

Upon expiry of the next time interval, the stream is directed once again to the first Encoder 34, to commence a second iteration of the encoding method. The method continues to iterate through the loop of cyclic encoding until no further data is received at the Application 18, indicating that the stream has finished.

Typically, a stream of length 'm' seconds, takes longer than 'm' seconds to encode Therefore, in later iterations of the loop, each of the Encoders 34, 36, 38, 40 operates to simultaneously encode a separate portion of the stream. Streams are directed to a buffer 34A, 36A, 38, 40A, respectively maintained by each Encoder 34, 36, 38, 40 in the event that an Encoder has not finished encoding from a previous iteration.

Figure 3A:
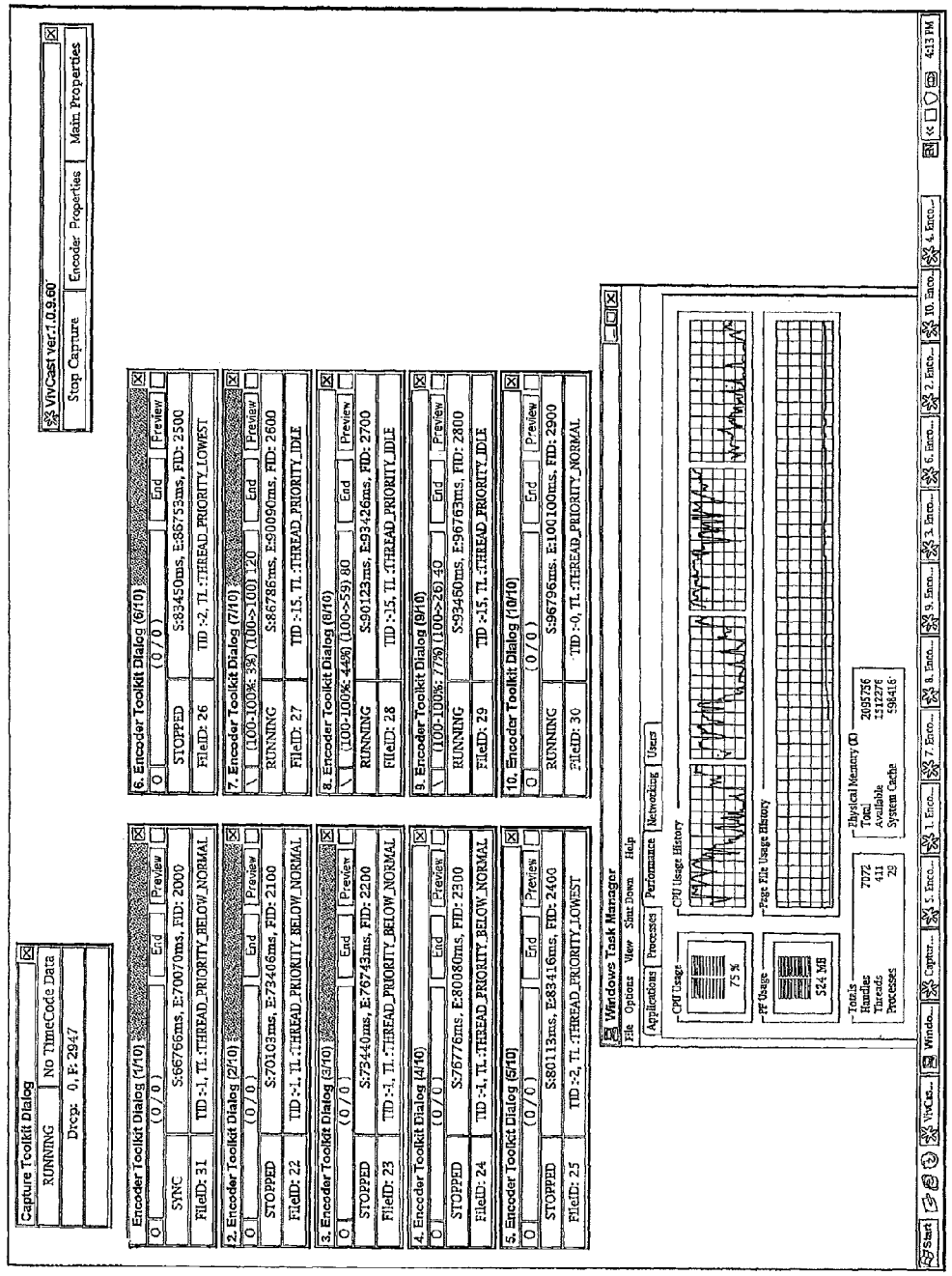
FIG. 3A is a screen shot illustrating the use of multiple software encoders.

FIG. 3A is a screen shot illustrating simultaneous encoding and related CPU performance data when ten software encoders are employed.

During each iteration, each encoder 34, 36, 38, 40, stores its encoded stream portion as a file 34B, 36B, 38B, 40B, which are named by the encoder according to a naming convention. For this purpose, a variable 'x', is maintained by the Application 18, and incremented after each iteration of the cyclic encoding loop.

The naming convention operates by Encoder 'n' inserting the value:

$$x+(n-1),$$

In the file name of the created file.

In the illustrated example of four Encoders;

Encoder 1 inserts values 0, 4, 8, 12 . . .

Encoder 2 inserts values 1, 5, 9, 13 . . .

Encoder 3 inserts values 2, 6, 10, 14 . . .

Encoder 4 inserts values 3, 7, 11, 15.

It will be realised that the naming convention assigns a sequence identifier to each encoded files that preserves the timing of the original live stream.

As discussed above, each file is transferred to a Host 24 via FTP after its creation. As different portions of the stream may take longer to encode than others, files are not necessarily uploaded to the Host 24, nor stored on the Host 24, in sequence order.

A portion of a typical file listing from a Host 24 after upload of sequential encoded video (.lsp) files, using ten encoders, is:

```
-rw-rw-r--   1 livestreaming  livestreaming      20 Feb  1 16:03 LS__Demo1__0000000.lsp
-rw-rw-r--   1 livestreaming  livestreaming      11 Feb  1 16:03 LS__Demo1__0000022.lsp
-rw-rw-r--   1 livestreaming  livestreaming      11 Feb  1 16:03 LS__Demo1__0000019.lsp
-rw-rw-r--   1 livestreaming  livestreaming      11 Feb  1 16:03 LS__Demo1__0000021.lsp
-rw-rw-r--   1 livestreaming  livestreaming   36608 Feb  1 16:03 LS__Demo1__0000012.lsp
-rw-rW-r--   1 livestreaming  livestreaming      11 Feb  1 16:03 LS__Demo1__0000013.lsp
-rw-rw-r--   1 livestreaming  livestreaming      11 Feb  1 16:03 LS__Demo1__0000014.lsp
-rw-rw-r--   1 livestreaming  livestreaming      11 Feb  1 16:03 LS__Demo1__0000015.lsp
-rw-rw-r--   1 livestreaming  livestreaming      11 Feb  1 16:03 LS__Demo1__0000016.lsp
-rw-rw-r--   1 livestreaming  livestreaming      11 Feb  1 16:03 LS__Demo1__0000017.lsp
-rw-rw-r--   1 livegtreaming  livestreaming      11 Feb  1 16:03 LS__Demo1__0000018.lsp
-rw-rw-r--   1 livestreaming  livestreaming  118856 Feb  1 16:03 LS__Demo1__0000011.lsp
-rw-rw-r--   1 livestreaming  livestreaming  271400 Feb  1 16:03 LS__Demo1__0000009.lsp
-rw-rw-r--   1 livestreaming  livestreaming  272842 Feb  1 16:03 LS__Demo1__0000008.lsp
-rw-rw-r--   1 livestreaming  livestreaming  280009 Feb  1 16:03 LS__Demo1__0000007.lsp
-rw-rw-r--   1 livestreaming  livestreaming  268628 Feb  1 16:02 LS__Demo1__0000006.lsp
-rw-rw-r--   1 livestreaming  livestreaming  268130 Feb  1 16:02 LS__Demo1__0000004.lsp
-rw-rw-r--   1 livestreaming  livestreaming  272430 Feb  1 16:02 LS__Demo1__0000005.lsp
-rw-rw-r--   1 livestreaming  livestreaming  279759 Feb  1 16:02 LS__Demo1__0000003.lsp.
-rw-rw-r--   1 livestreaming  livestreaaming 272226 Feb  1 16:02 LS__Demo1__0000002.lsp
-rw-rw-r--   1 livestreaming  livestreaming  274749 Feb  1 16:02 LS__Demo1__0000001.lsp.
-rw-rw-r--   1 livestreaming  livestreaming    4794 Feb  1 16:02 LS__Demo1__0000000.v v
```

Figure 3:
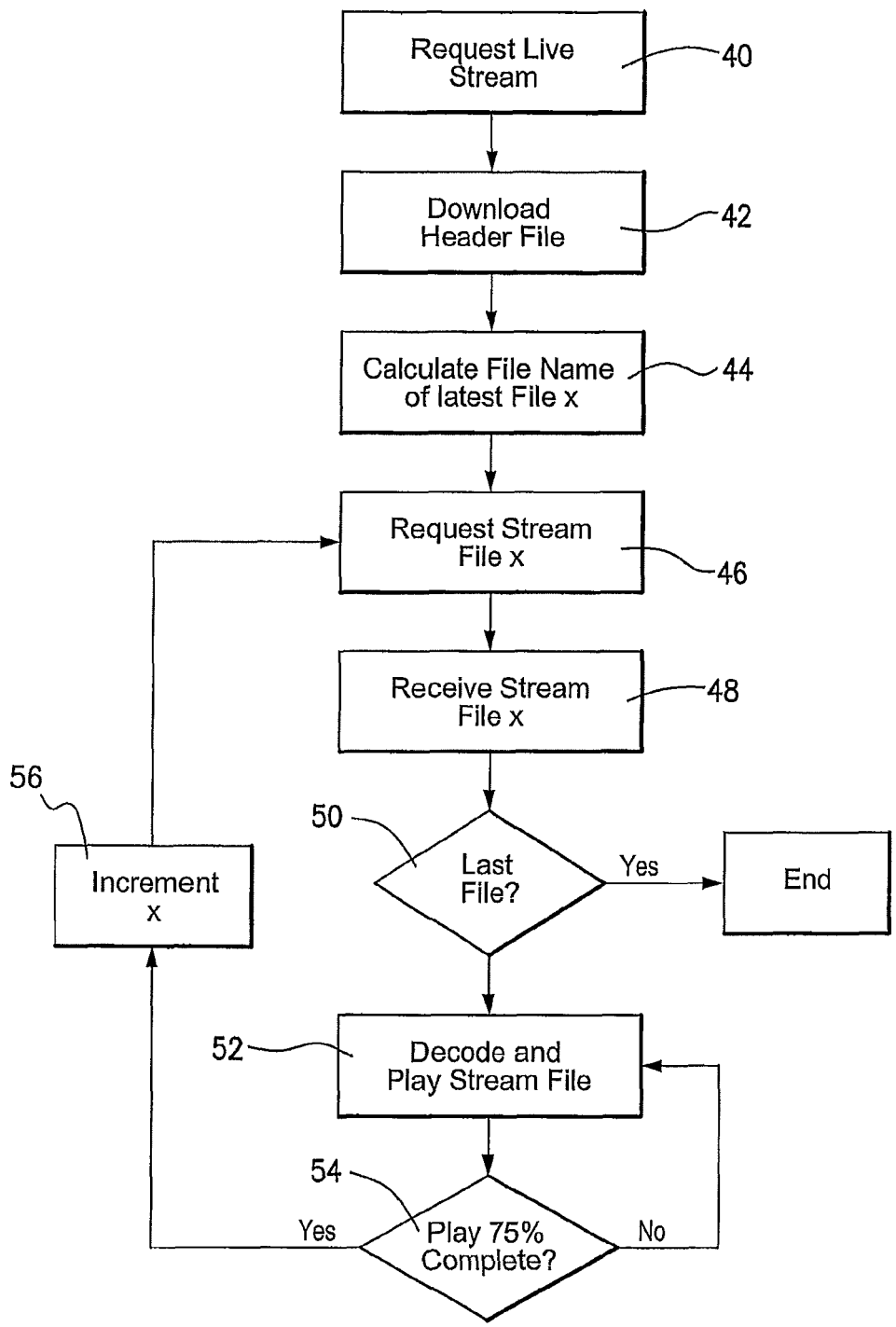
FIG. 3 is a flowchart illustrating the steps executed by a media player in receiving and playing live content, streamed to the player in accordance with the present invention.

Turning to FIG. 3, the steps executed by a Media Player 30 in receiving and playing live content, are schematically illustrated. At step 40, a viewer enters a request into the Media Player 30 to watch a selected stream of live content. If the selected event is yet to commence—such as sporting event or concert—the viewer is notified of the commencement time. Otherwise, the viewer is asked whether they wish to watch the event from its current position, or from the beginning.

At step 42 a Data File (known a the Header, or .viv file) is received from the Host 24. The Header file is created and uploaded to the Host 24 before any of the video files and is also the first file to be downloaded to the Media Player 30.

The Header File includes the following information:
Crytographic Keys, used to decode the video files;
Client tracking information;
Statistics Data;
Time of live stream commencement ($t_c$);
Audio codec initialisation data;
Video codec initialisation data;
Frame rate (FPs) of encoded video;
Number of frames encoded in each file ($F_{block}$);
URL of first sequential file (including file name);
URL of end file (.lsf file above)
Alternative Host URL
Performance Optimisation Data; and
URL of Time Server In the event that a viewer wishes to watch a live stream from its current position, the Media Player 30 must, at step 44, calculate sequence number of the last file in the sequence $S_L$, the file of course encoding the most recently received portion of the live stream. This is achieved by the Media Player 30 first obtaining the current time ($t_r$) from a Time Server 35 (FIG. 1), the URL of which is included in the Header file.

Subtracting the stream commencement time stream ($t_c$) (which is provided in the Header File) from the current time ($t_r$) allows the elapsed time ($t_e$) of the live stream to be calculated.

Dividing the elapsed time ($t_e$) by the frame rate (FPS) of the encoded video (also provided in the Header file) yields the total number of frames ($F_e$) of live content captured since its commencement.

Finally, dividing $F_e$ by the number of frames in each file ($F_{block}$), yields the highest desired sequence number $S_L$, The formula may be written as:

$$S_L = F_e / F_{block}$$

$$F_e = t_e / FPs$$

$$t_e = t_c - t_r$$

At step 46, the Media Player 30 requests the file with the calculated sequence number from the URL of the Host (which is provided in the Header File). This file is then downloaded to the Media Player at step 48.

At step 50 the Media Player determines whether the live stream has ended. Completion of a live stream is indicated by delivering a special purpose (.lsf) video file to the Media Player.

If the stream has not ended, the Media Player at step 52 extracts the audiovisual data from the file, decodes the data using the information in the Header File, and commences playing the decoded data. The Media Player may append decoded data to the end of a buffer where previously received data is still being decoded or played.

After playing, at step 54, about 75% of decoded data in a file, the Media Player at step 56, increments the sequence number, and returns to step 46 and requests the file containing the new sequence number from the Host.

The period between incrementing the sequence number and requesting the next file, can be varied in accordance with the length of the video contained in each file, and the speed of connection between the Media Player and the Host.

Figure 4:
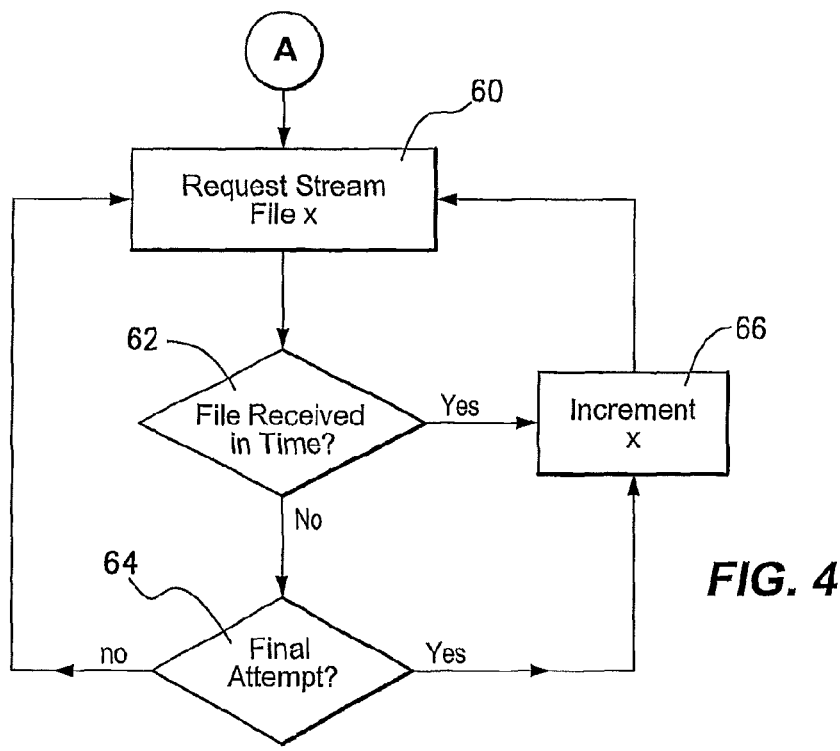
FIGS. 4 and 5 are flowcharts, illustrating media player recovery methods employed if stream files are not received within an acceptable timeframe.
Figure 5:
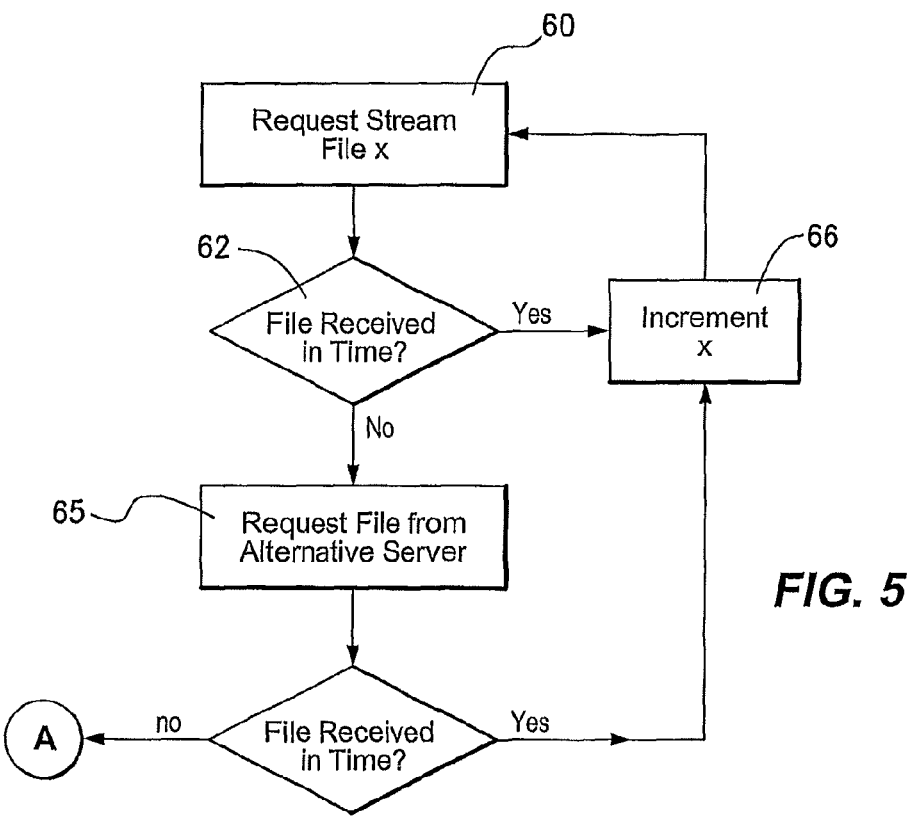

FIGS. 4 and 5 are flowcharts illustrating two Media Player strategies for dealing with the non-arrival of requested sequential files. At step 60, the Media Player requests a sequential file. If the file is not received within a predetermined time (step 62), the method returns to step 60 and the same file is requested again. If the file again fails to arrive—possibly because it was never encoded or successfully uploaded to the Host—the current sequence number is incremented at step 66.

The method then returns to step 60 where the file with the incremented sequence number is requested.

Turning to FIG. 5, an alternative method is illustrated. At step 60 a sequential file is requested. If the file is not received within a predetermined time frame (step 62), the file is requested from an alternative server (step 65), the URL of which is provided in the Header File. If the file is not received within a predetermined time frame (step 66) the method described in FIG. 4, may be adopted. If the file delivery is successful, the sequence number is incremented (step 66), and the method returns to step 60 to request the next sequential file.

The above description is by way of illustration only and modifications and improvements obvious to the person skilled in the art are intended to fall with the spirit and scope of the present invention.

The word 'comprising' and forms of the word 'comprising' as used in this description and in the claims do not limit the invention claimed to exclude any variants or additions. Modifications and improvements to the invention will be readily apparent to those skilled in the art. Such modifications and improvements are intended to be within the scope of this invention.

The invention claimed is:

1. A method for streaming live content, comprising:
receiving a content stream comprising live content;
directing successive portions of the received content stream to an encoder;
sequentially encoding, by the encoder, each portion of the content stream into an encoded content file to obtain a plurality of encoded content files that are sequential while simultaneously receiving newly arrived portions of the content stream, the encoding of each of the encoded content files occurring prior to a request for the respective encoded that content file;
assigning a sequence identifier to each of the encoded content files;
storing the encoded content files on a host with the sequence identifier being recorded in the file name of each of the encoded content files;
delivering a data file to a media player responsive to a request for content, said data file including information enabling the media player to: sequentially and individually request each of the encoded content files from the host to obtain the content from the content stream, each of the sequential and individual requests using the file name including the encoded content file's assigned sequence identifier; calculate the sequence identifier of, and thereby request, the encoded content file containing the most recently received portion of the content stream at the time of the request, wherein the sequence identifier of the most recently received portion is calculated according to a commencement time, a current time, a frame rate, and a number of frames stored per each of the encoded content files; and to decode and play the requested content file; and
delivering the requested encoded content files responsive to each of the sequential and individual requests.

2. The method according to claim 1, wherein the data file includes the file name of a first content file, and a network location of the host.

3. The method according to claim 2, wherein the data file includes a network location of one or more additional hosts from which a media player may request a content file, when a previously requested encoded content file does not arrive within a specified timeframe.

4. The method according to claim 1,
wherein the sequence identifier of the last content file in the sequence ($S_L$) of the requested encoded content files is calculated according to the following formulas:

$S_L = F_e / F_{block}$ $F_e = t_e / FPs$ $t_e = t_c - t_r$ wherein the commencement time is represented by ($t_c$), the current time is represented by ($t_r$), the frame rate is of the content stored in each content file and is represented by (FPs), and the number of frames stored per each of the encoded content files is represented by ($F_{block}$).

5. The method according to claim 1, wherein the host is a web server, streaming content to one or more additional media players coupled to the web server over the Internet.

6. The method according to claim 1, wherein the host is an ingestion system for a content delivery network.

7. The method according to claim 1, wherein the encoding comprises cyclically directing the content stream through two or more encoders.

8. The method according to claim 7, wherein the two or more encoders simultaneously encode different portions of the content stream.

9. The method according to claim 1, wherein a time interval of each of the successive portions is determined based on a real time quality of the content and an efficiency of the encoder.

10. A live content streaming system, comprising:
a processor;
a streaming application executable on the processor and having an encoder; and
a host communicatively coupled to the streaming application,
wherein, the streaming application is configured to:
receive a content stream comprising live content;
direct successive portions of the received content stream to the encoder;
sequentially encode, using the encoder, each portion of the content stream into an encoded content file to obtain a plurality of encoded content files that are sequential while simultaneously receiving newly arrived portions of the content stream the encoding of each of the encoded content files occurring prior to a request for the respective encoded content file;
assign a sequence identifier to each of the encoded content files upon its creation with the sequence identifier being recorded in the file name of each of the encoded content files;
transfer the encoded content files to the host along with a data file including information enabling a media player to: sequentially and individually request each of the encoded content files from the host to obtain the content from the content stream, each of the sequential and individual requests using the file name including the encoded content file's assigned sequence identifier; calculate the sequence identifier of, and thereby request, the encoded content file containing the most recently received portion of the content stream at the time of the request, wherein the sequence identifier of the most recently received portion is calculated according to a commencement time, a current time, a frame rate, and a number of frames stored per each of the encoded content files; and to decode and play the requested content file; and
deliver the requested encoded content files responsive to each of the sequential and individual requests.

11. The live content streaming system according to claim 10, wherein the data file includes the file name of a first sequential content file and a network location of the host.

12. The live content streaming system according to claim 10, wherein the sequence identifier of the last sequential content file in the sequence ($S_L$) of the requested encoded content files is calculated according to the following formulas:

$$S_L = F_e / F_{block}$$

$$F_e = t_c / FPs$$

$$t_c = t_c - t_r$$

wherein the commencement time is represented by ($t_c$), the current time is represented by ($t_r$), the frame rate is of the content stored in each content file and is represented by (FPs), and the number of frames stored per each of the encoded content files is represented by ($F_{block}$).

13. The live content streaming system according to claim 12, wherein the data file includes a network location of one or more additional hosts from which a media player may request a content file, when a previously requested encoded content file does not arrive within a specified timeframe.

14. The live content streaming system according to claim 10, wherein the host is a web server, streaming content to one or more additional medial players coupled to the web server over the Internet.

15. The live content streaming system according to claim 10, wherein the host is an ingestion system for a content delivery network.

16. The live content streaming system according to claim 10, wherein the content is periodically encoded by cyclically directing the content stream through two or more encoders.

17. The live content streaming system according to claim 16, wherein the encoders simultaneously encode different portions of the content stream.

18. A system, comprising
a microprocessor and a tangible, non-transitory computer-readable medium coupled thereto, wherein the microprocessor receives and executes instructions from the computer-readable medium and wherein the instructions cause the microprocessor to:
receive a content stream comprising live content;
direct successive portions of the received content stream to an encoder;
sequentially encode, by the encoder, each portion of the content stream into an encoded content file to obtain a plurality of encoded content files that are sequential while simultaneously receiving newly arrived portions of the content stream, the encoding of each of the encoded content files occurring prior to a request for the respective encoded content file;
assign a sequence identifier to each of the encoded content files;
store the encoded content files on a host with the sequence identifier being recorded in the file name of each of the encoded content files;
deliver a data file to a media player responsive to a request for content, said data file including information enabling the media player to: sequentially and individually request each of the encoded content files from the host to obtain the content from the content stream, each of the sequential and individual requests using the file name including the encoded content file's assigned sequence identifier; calculate the sequence identifier of, and thereby request, the encoded content file containing the most recently received portion of the content stream at the time of the request, wherein the sequence identifier of the most recently received portion is calculated according to a commencement time, a current time, a frame rate, and a number of frames stored per each of the encoded content files; and to decode and play the requested content file; and
deliver the requested encoded content files responsive to each of the sequential and individual requests.

19. The program according to claim 18, wherein a time interval of each of the successive portions is determined based on a real time quality of the content and an efficiency of the encoders.

20. A system, comprising:
one or more microprocessors;
an encoder; and
a microprocessor executable work assignment engine that, when executed by the one or more microprocessors in one or more servers, performs live content streaming by:
receiving a content stream comprising live content;
directing successive portions of the received content stream to an encoder;
sequentially encoding, by the encoder, each portion of the content stream into an encoded content file to obtain a plurality of encoded content files that are sequential while simultaneously receiving newly arrived portions of the content stream, the encoding of each of the encoded content files occurring prior to a request for the respective encoded content file;
assigning a sequence identifier to each of the encoded content files;
storing the encoded content files on a host with the sequence identifier being recorded in the file name of each of the encoded content files;
delivering a data file to a media player responsive to a request for content, said data file including information enabling the media player to: sequentially and individually request each of the encoded content files from the host to obtain the content from the content stream, each of the sequential and individual requests using the file name including the encoded content file's assigned sequence identifier; calculate the sequence identifier of, and thereby request, the encoded content file containing the most recently received portion of the content stream at the time of the request, wherein the sequence identifier of the most recently received portion is calculated according to a commencement time, a current time, a frame rate, and a number of frames stored per each of the encoded content files; and to decode and play the requested content file; and
delivering the requested encoded content files responsive to each of the sequential and individual requests.

* * * * *